United States Patent
Hiruta

(10) Patent No.: US 12,407,696 B2
(45) Date of Patent: *Sep. 2, 2025

(54) SUSPICIOUS COMMUNICATION DETECTION APPARATUS, SUSPICIOUS COMMUNICATION DETECTION METHOD, AND SUSPICIOUS COMMUNICATION DETECTION PROGRAM

(71) Applicant: NEC Corporation, Tokyo (JP)

(72) Inventor: Shohei Hiruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 358 days.

This patent is subject to a terminal disclaimer.

(21) Appl. No.: 18/124,786

(22) Filed: Mar. 22, 2023

(65) Prior Publication Data
US 2024/0073227 A1    Feb. 29, 2024

(30) Foreign Application Priority Data
Aug. 31, 2022  (JP) .................................. 2022-138555

(51) Int. Cl.
*H04L 9/40*     (2022.01)
*H04L 9/00*     (2022.01)

(52) U.S. Cl.
CPC ...... *H04L 63/1416* (2013.01); *H04L 63/1425* (2013.01); *H04L 9/00* (2013.01);
(Continued)

(58) Field of Classification Search
None
See application file for complete search history.

(56) References Cited

U.S. PATENT DOCUMENTS 11,494,253 B2 *  11/2022  Savir ..................... G06N 20/00
12,271,830 B2 *  4/2025   Wakita ............. H01L 21/67017
(Continued)

FOREIGN PATENT DOCUMENTS

CN        109040059 A  *  12/2018  ......... H04L 63/0428
CN        109818976 A  *  5/2019
(Continued)

OTHER PUBLICATIONS

Zhihong Zhou, Hu Bin, Jianhua Li, Ying Yin, Xiuzhen Chen, Jin Ma and Lihong Yao (Malicious encrypted traffic features extraction model based on unsupervised feature adaptive learning); pp. 11; Published on May 22, 2022.*

(Continued)

*Primary Examiner* — Ali H. Cheema

(57) ABSTRACT

An apparatus, method, and program for detecting suspicious communications are described herein. In some implementations, the method includes managing received communications in a database by separating them as encrypted communications and as non-encrypted communications; determining whether each received communication is an encrypted communication or a non-encrypted communication; performing padding on transmission and reception size values and transmission and reception packet numbers of the non-encrypted communication to fill in a difference from the encrypted communication; generating features from the non-encrypted communication obtained after padding and registering the features in the database; training a machine learning model by using features of the non-encrypted communications registered in the database as training data; referring to the database by using information about a received encrypted communication; entering obtained features about the received encrypted communication to the machine learning model; and determining whether the (Continued)

received encrypted communication is a suspicious communication.

15 Claims, 12 Drawing Sheets

(52) U.S. Cl.
CPC ......... *H04L 9/008* (2013.01); *H04L 63/0428* (2013.01); *H04L 63/10* (2013.01)

(56) References Cited

U.S. PATENT DOCUMENTS

| | | |
|---|---|---|
| 2006/0198313 A1 | 9/2006 | Kitamura et al. |
| 2016/0179444 A1* | 6/2016 | Takasu ............... G06F 3/1288 358/1.15 |
| 2018/0089574 A1 | 3/2018 | Goto |
| 2018/0167216 A1* | 6/2018 | Walrant ............... H04L 9/0894 |
| 2020/0202076 A1* | 6/2020 | Wang ................ G06F 18/2148 |
| 2022/0224716 A1* | 7/2022 | Salji .................... H04L 63/1441 |
| 2024/0104710 A1* | 3/2024 | Mullet ............... G06Q 10/0635 |
| 2024/0289209 A1* | 8/2024 | Ghalehtaki ............ G06F 11/08 |

FOREIGN PATENT DOCUMENTS

| | | | | |
|---|---|---|---|---|
| CN | 111277587 A | * | 6/2020 | ........... H04L 41/145 |
| CN | 113177203 A | * | 7/2021 | ............. G06F 21/55 |
| CN | 114143037 A | * | 3/2022 | |
| CN | 114640519 A | * | 6/2022 | |
| CN | 115314291 A | * | 11/2022 | |
| CN | 115412316 A | * | 11/2022 | |
| CN | 114239855 B | * | 8/2023 | |
| CN | 116647352 A | * | 8/2023 | |
| EP | 3869374 B1 | * | 9/2023 | ............. G06F 21/12 |
| JP | 2006-279930 A | | 10/2006 | |
| JP | 2007-325293 A | | 12/2007 | |
| JP | 2016-038881 A | | 3/2016 | |
| JP | 2017-130037 A | | 7/2017 | |
| JP | 2018-054765 A | | 4/2018 | |
| JP | 2021-036654 A | | 3/2021 | |

OTHER PUBLICATIONS

Michael J. De Lucia and Chase Cotton (Detection of Encrypted Malicious Network Traffic using Machine Learning); pp. 6; Published on IEEE in Mar. 5, 2020.*

* cited by examiner

FIG. 4

EXAMPLE OF NON-ENCRYPTED COMMUNICATION INFORMATION MANAGEMENT TABLE

| ID | TIME | SOURCE IP ADDRESS | DESTINATION IP ADDRESS | SOURCE PORT NUMBER | DESTINATION PORT NUMBER | TRANSMISSION BYTE NUMBER | RECEPTION BYTE NUMBER | TRANSMISSION PACKET NUMBER | RECEPTION PACKET NUMBER | COMMUNICATION TIME | DIRECTION | FEATURE ID | WARNING FLAG |
|---|---|---|---|---|---|---|---|---|---|---|---|---|---|
| 1 | 20220101T00:00:00 | IP ADDRESS A | IP ADDRESS X | 50000 | 80 | 1,740 | 5,530 | 13 | 8 | 0 | inbound | F1 | 1 |
| 2 | 20220101T00:00:00 | IP ADDRESS B | IP ADDRESS Y | 59426 | 80 | 434 | 262 | 5 | 3 | 1 | inbound | F2 | 0 |
| 3 | 20220101T00:00:00 | IP ADDRESS C | IP ADDRESS Z | 58993 | 80 | 1,477 | 3,589 | 14 | 12 | 1 | inbound | F3 | 0 |
| 4 | 20220101T00:00:01 | IP ADDRESS A | IP ADDRESS X | 50001 | 80 | 1,740 | 8,622 | 13 | 11 | 0 | inbound | F1 | 1 |
| 5 | 20220101T01:00:00 | IP ADDRESS X | IP ADDRESS D | 55000 | 80 | 2,146 | 27,411 | 13 | 26 | 17 | outbound | F4 | 0 |

FIG. 5

EXAMPLE OF NON-ENCRYPTED COMMUNICATION FEATURE MANAGEMENT TABLE

FIG. 6

EXAMPLE OF ENCRYPTED COMMUNICATION INFORMATION MANAGEMENT TABLE

| ID | TIME | SOURCE IP ADDRESS | DESTINATION IP ADDRESS | SOURCE PORT NUMBER | DESTINATION PORT NUMBER | TRANSMISSION BYTE NUMBER | RECEPTION BYTE NUMBER | TRANSMISSION PACKET NUMBER | RECEPTION PACKET NUMBER | COMMUNICATION TIME | DIRECTION | DETERMINATION TARGET ID |
|---|---|---|---|---|---|---|---|---|---|---|---|---|
| 1 | 20220101T00:00:00 | IP ADDRESS A | IP ADDRESS X | 57080 | 443 | 1,442 | 3,497 | 12 | 9 | 6 | inbound | F_in1 |
| 2 | 20220101T00:00:00 | IP ADDRESS B | IP ADDRESS Y | 53267 | 443 | 581 | 260 | 5 | 4 | 2 | inbound | F_in2 |
| 3 | 20220101T00:00:00 | IP ADDRESS C | IP ADDRESS Z | 59371 | 443 | 7,226 | 7,140 | 26 | 13 | 33 | inbound | F_in3 |
| 4 | 20220101T00:00:01 | IP ADDRESS A | IP ADDRESS X | 57081 | 443 | 1,465 | 4,705 | 11 | 11 | 9 | inbound | F_in1 |
| 5 | 20220101T01:00:00 | IP ADDRESS X | IP ADDRESS O | 55894 | 443 | 1,803 | 1,672 | 10 | 9 | 26 | outbound | F_out1 |

FIG. 7

EXAMPLE OF INBOUND ENCRYPTED COMMUNICATION FEATURE MANAGEMENT TABLE

EXAMPLE OF OUTBOUND ENCRYPTED COMMUNICATION FEATURE MANAGEMENT TABLE

FIG. 8

EXAMPLE OF INBOUND ENCRYPTED
COMMUNICATION FLAG MANAGEMENT TABLE

| DETERMINATION TARGET ID | SUSPICIOUS |
|---|---|
| F_in1 | 0 |
| F_in2 | 0 |
| F_in3 | 0 |

EXAMPLE OF OUTBOUND ENCRYPTED
COMMUNICATION FLAG MANAGEMENT TABLE

| DETERMINATION TARGET ID | SUSPICIOUS |
|---|---|
| F_out1 | 0 |

FIG. 9

EXAMPLE OF OUTBOUND ENCRYPTED
COMMUNICATION FLAG MANAGEMENT TABLE

| DETERMINATION TARGET ID | SUSPICIOUS |
|---|---|
| F_out1 | 1 |

EXAMPLE OF INBOUND ENCRYPTED
COMMUNICATION FLAG MANAGEMENT TABLE

| DETERMINATION TARGET ID | SUSPICIOUS |
|---|---|
| F_in1 | 1 |
| F_in2 | 1 |
| F_in3 | 0 |

FIG. 10

EXAMPLE OF INBOUND ENCRYPTED
COMMUNICATION FLAG MANAGEMENT TABLE

| DETERMINATION TARGET ID | SUSPICIOUS |
|---|---|
| F_in1 | 1 |
| F_in2 | 0 |
| F_in3 | 0 |

EXAMPLE OF OUTBOUND ENCRYPTED
COMMUNICATION FLAG MANAGEMENT TABLE

| DETERMINATION TARGET ID | SUSPICIOUS |
|---|---|
| F_out1 | 1 |

# SUSPICIOUS COMMUNICATION DETECTION APPARATUS, SUSPICIOUS COMMUNICATION DETECTION METHOD, AND SUSPICIOUS COMMUNICATION DETECTION PROGRAM

REFERENCE TO RELATED APPLICATION

The present invention is based upon and claims the benefit of the priority of Japanese patent application No. 2022-138555, filed on Aug. 31, 2022, the disclosure of which is incorporated herein in its entirety by reference thereto.

FIELD

The present invention relates to a suspicious communication detection apparatus, a suspicious communication detection method, and a suspicious communication detection program.

BACKGROUND

The number of encrypted communications is increasing in the current communications. However, signatures of an intrusion detection system (IDS) cannot respond to encrypted communications, and therefore, alerts cannot be issued. Thus, a technique of determining whether a communication is an attack using an encrypted communication is demanded.

The existing encrypted communication analysis techniques can be generally divided in two kinds of known methods. In one kind of method, an encrypted communication is first decrypted at an exit and is next analyzed. The analyzed communication is next encrypted again. However, if an encrypted communication is analyzed after decrypted as in this technique, the communication performed while the encrypted communication is being decrypted is not secure. Thus, attackers have more opportunities to attack. In the other kind of method, an encrypted communication is analyzed by using information that has not been encrypted (e.g., a header or a TLS handshake). For example, patent literature 1 discusses a technique of extracting a source IP address from a header of an encrypted communication, calculating the reliability of the source IP address, and determining whether the encrypted communication is an attack or not. However, this technique of analyzing an encrypted communication by using information that has not been encrypted has a weak point in that attackers can easily avoid this technique. The attackers can use a different IP address and can also fake a normal TLS handshake.

PTL 1: Japanese Unexamined Patent Application Publication No. 2007-325293

SUMMARY

The disclosure of the above patent literature is incorporated herein in its entirety by reference thereto. The following analysis has been made by the present inventors.

Determining whether an encrypted communication is a suspicious communication without decrypting the encrypted communication has a problem with the determination accuracy. First, because the determination is performed without decrypting the encrypted communication, payload information cannot be used for the determination. Thus, when whether an encrypted communication is a suspicious communication is determined without decrypting the encrypted communication, this determination is performed based on statistical information. In addition, it is difficult to allocate labels for learning to all encrypted communications.

This determination also has a problem in that the determination accuracy is low for inbound encrypted communications. According to preliminary experiment conducted on the determination, although a characteristic tendency has been seen in suspicious communications for offensive purposes in outbound encrypted communications, no characteristic tendency has been seen in suspicious communications for offensive purposes in inbound encrypted communications. Thus, there are cases in which the determination accuracy is low for inbound encrypted communications.

In view of the above problems, it is an object of the present invention to provide a suspicious communication detection apparatus, a suspicious communication detection method, and a suspicious communication detection program that contribute to determining whether an encrypted communication is a suspicious communication without decrypting the encrypted communication.

In a first aspect of the present invention, there is provided a suspicious communication detection apparatus, including: a database in which information extracted from received communications is managed separately as encrypted communications and as non-encrypted communications; a registration part that determines whether a received communication is an encrypted communication or a non-encrypted communication, performs padding on transmission and reception size values and transmission and reception packet numbers of the non-encrypted communication to fill in a difference from an encrypted communication, generates features from the non-encrypted communication obtained after the padding, and registers the features in the database; a learning part that trains a machine learning model by using features of non-encrypted communications registered in the database as training data, wherein the machine learning model receives features of an encrypted communication, and determines whether the encrypted communication is a suspicious communication; and a determination part that refers to the database by using information about a received encrypted communication, enters obtained features about the received encrypted communication to the machine learning model, and determines whether the received encrypted communication is a suspicious communication.

In a second aspect of the present invention, there is provided a suspicious communication detection method, including: causing an information processing apparatus, which includes a database in which information extracted from received communications is managed separately as encrypted communications and as non-encrypted communications and a machine learning model that receives features of a communication and determines whether the communication is a suspicious communication, to determine whether a received communication is an encrypted communication or a non-encrypted communication; causing the information processing apparatus to perform padding on transmission and reception size values (byte numbers) and transmission and reception packet numbers of the non-encrypted communication to fill in a difference from an encrypted communication; causing the information processing apparatus to generate features from the non-encrypted communication obtained after the padding and register the features in the database; causing the information processing apparatus to train the machine learning model by using features of non-encrypted communications registered in the database as training data; and causing the information processing apparatus to refer to the database by using information about a received encrypted communication, enter obtained features about the received encrypted communication to the machine learning model, and determine whether the received encrypted communication is a suspicious communication.

In a third aspect of the present invention, there is provided a non-transient computer readable medium storing a program, causing an information processing apparatus, which includes a database in which information extracted from received communications is managed separately as encrypted communications and as non-encrypted communications and a machine learning model that receives features of a communication and determines whether the communication is a suspicious communication, to perform: determining whether a received communication is an encrypted communication or a non-encrypted communication; performing padding on transmission and reception size values (byte numbers) and transmission and reception packet numbers of the non-encrypted communication to fill in a difference from an encrypted communication; generating features from the non-encrypted communication obtained after the padding and registering the features in the database; training the machine learning model by using features of non-encrypted communications registered in the database as training data; and referring to the database by using information about a received encrypted communication, entering obtained features about the received encrypted communication to the machine learning model, and determining whether the received encrypted communication is a suspicious communication. The program can be recorded in a computer-readable storage medium. The storage medium may be a non-transient storage medium such as a semiconductor memory, a hard disk, a magnetic recording medium, or an optical recording medium. The present invention can be embodied as a computer program product.

According to the individual aspects of the present invention, there are provided a suspicious communication detection apparatus, a suspicious communication detection method, and a suspicious communication detection program that contribute to determining whether an encrypted communication is a suspicious communication without decrypting the encrypted communication.

BRIEF DESCRIPTION OF THE DRAWINGS

FIG. 4 is a drawing illustrating an example of a non-encrypted communication information management table.

FIG. 5 is a drawing illustrating an example of a non-encrypted communication feature management table.

FIG. 6 is a drawing illustrating an example of an encrypted communication information management table.

FIG. 7 is a drawing illustrating examples of encrypted communication feature management tables.

FIG. 8 is a drawing illustrating examples of encrypted communication flag management tables.

FIG. 9 is a drawing illustrating examples of suspicious flags.

FIG. 10 is a drawing illustrating an example of change of a suspicious flag.

EXAMPLE EMBODIMENTS

Figure 1:
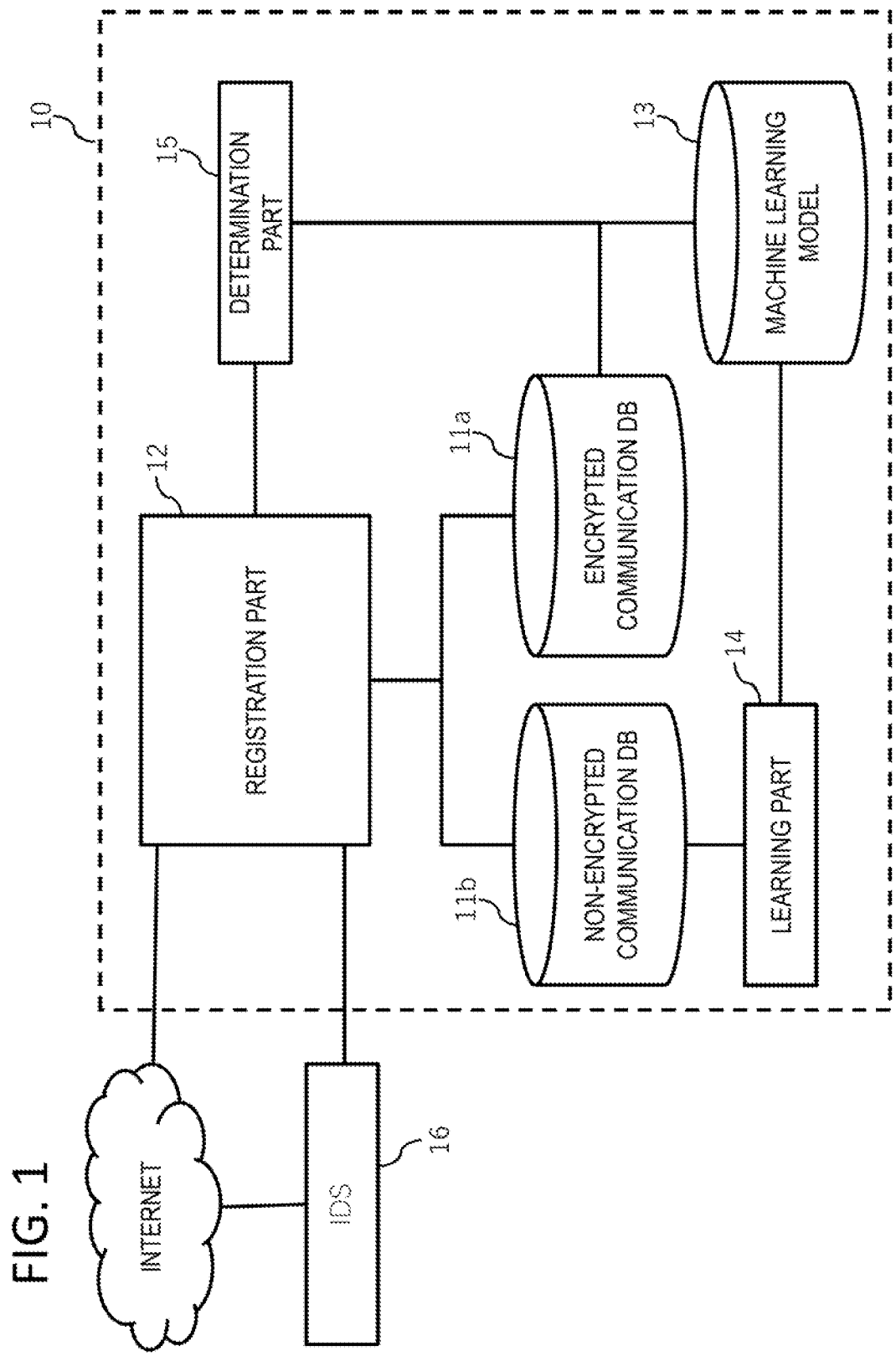
FIG. 1 is a schematic drawing illustrating a basic configuration according to an example embodiment of the present invention.

Hereinafter, example embodiments of the present invention will be described with reference to the drawings. However, the present invention is not limited to the following example embodiments. In addition, in the drawings, the same or equivalent elements are denoted by the same reference characters, as needed. In addition, the drawings are schematic drawings, and therefore, it should be noted that the sizes, ratios, etc. of the individual elements may differ from the actual sizes, ratios, etc. An element in a drawing may have a portion whose size or ratio differs from that of the portion of the element in a different drawing.

[Suspicious Communication Detection Apparatus]

FIG. 1 is a schematic diagram illustrating a basic configuration according to an example embodiment of the present invention. As illustrated in FIG. 1, a suspicious communication detection apparatus 10 according to the example embodiment of the present invention includes databases 11a and 11b, a registration part 12, a machine learning model 13, a learning part 14, and a determination part 15.

In the databases 11a and 11b, information extracted from received communications is managed separately as encrypted communications and non-encrypted communications. Although the encrypted communication database 11a for encrypted communications and the non-encrypted communication database 11b for non-encrypted communications are separately illustrated in FIG. 1, as long as these encrypted and non-encrypted communications are managed separately, these communications do not need to be physically separated.

The registration part 12 determines whether a received communication(s) is an encrypted communication(s) or a non-encrypted communication(s), performs padding on the transmission and reception size values (byte numbers) and the transmission and reception packet numbers of the non-encrypted communication(s) to fill in a difference of those of encrypted communication(s) from an encrypted communication(s), generates features from the non-encrypted communication(s) obtained after the padding, and registers the features in the databases 11a and 11b.

The machine learning model 13 is a determination algorithm that receives features of an encrypted communication(s) and that determines whether the encrypted communication(s) is a suspicious communication(s). The learning part 14 trains the machine learning model 13, which receives features of an encrypted communication(s) and determines whether the encrypted communication(s) is a suspicious communication(s), by using the features of the non-encrypted communications registered in the database 11b as training data. The information about the non-encrypted communications registered in the database 11b includes the detection results obtained by an intrusion detection system (IDS) 16, and the learning part 14 trains the machine learning model 13 by using the detection results obtained by the intrusion detection system (IDS) 16 as a reference.

The determination part 15 uses information about a received encrypted communication(s), refers to the databases, enters the obtained features about the received encrypted communication(s) to the machine learning model, and determines whether the received encrypted communication(s) is a suspicious communication(s).

As described above, the suspicious communication detection apparatus 10 according to the example embodiment of the present invention trains the machine learning model 13, which determines whether an encrypted communication(s) is a suspicious communication(s), by using, as training data, the detection results obtained by the intrusion detection system (IDS) 16 on the non-encrypted communications. Thus, although the intrusion detection system (IDS) 16 does not function with respect to encrypted communications, because the suspicious communication detection apparatus 10 performs padding on the transmission and reception size values (byte numbers) and the transmission and reception packet numbers of a non-encrypted communication(s) to fill in a difference from an encrypted communication(s), the suspicious communication detection apparatus 10 can also perform detection of a suspicious communication on the encrypted communications while reflecting the detection results obtained by the intrusion detection system (IDS) 16.

Hereinafter, configurations and functions of the suspicious communication detection apparatus 10 will be described in more detail.

Figure 2:
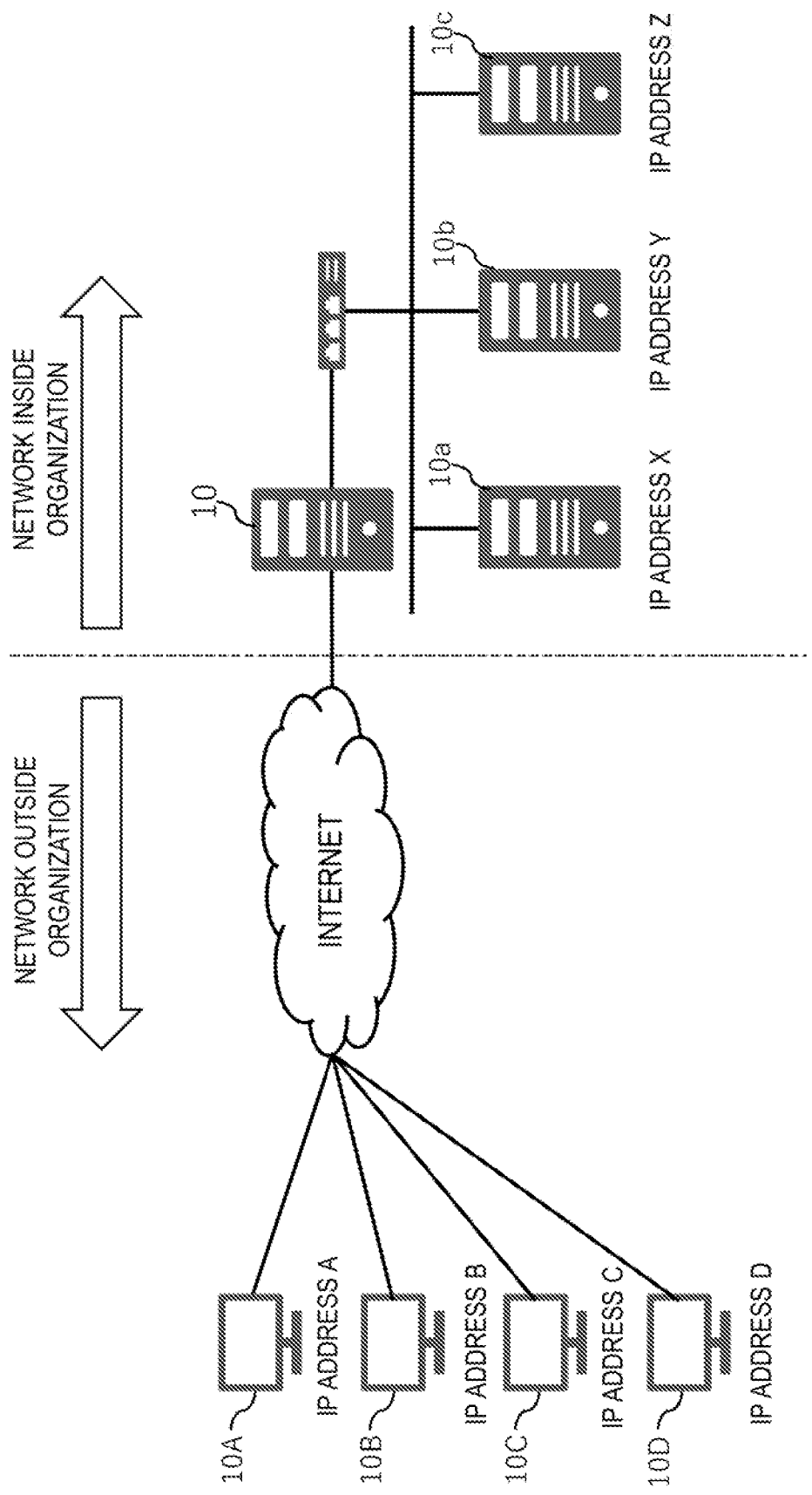
FIG. 2 is a schematic drawing illustrating an example of an environment in which a suspicious communication detection apparatus according to the example embodiment of the present invention is used.

FIG. 2 is a schematic drawing illustrating an example of an environment in which the suspicious communication detection apparatus according to the example embodiment of the present invention is used. As illustrated in FIG. 2, when information processing apparatuses 10a to 10c connected to a network inside an organization communicate with information processing apparatuses 10A to 10D connected to a network outside the organization via the Internet, the suspicious communication detection apparatus 10 according to the example embodiment of the present invention relays the communications at an entrance of the internal network. The internal network belongs to the inside of the organization, and the external network belongs to the outside of the organization. The suspicious communication detection apparatus 10 receives a communication(s) between the internal network and the external network. In this example, IP addresses X to Z are allocated to the information processing apparatuses 10a to 10c connected to the internal network, respectively, and IP addresses A to D are allocated to the information processing apparatuses 10A to 10D connected to the external network, respectively. The suspicious communication detection apparatus 10 can determine whether a communication(s) is an inbound communication(s) or an outbound communication(s) based on these IP addresses. An inbound communication is a communication from the external network to the internal network, and an outbound communication is a communication from the internal network to the external network.

Figure 3:
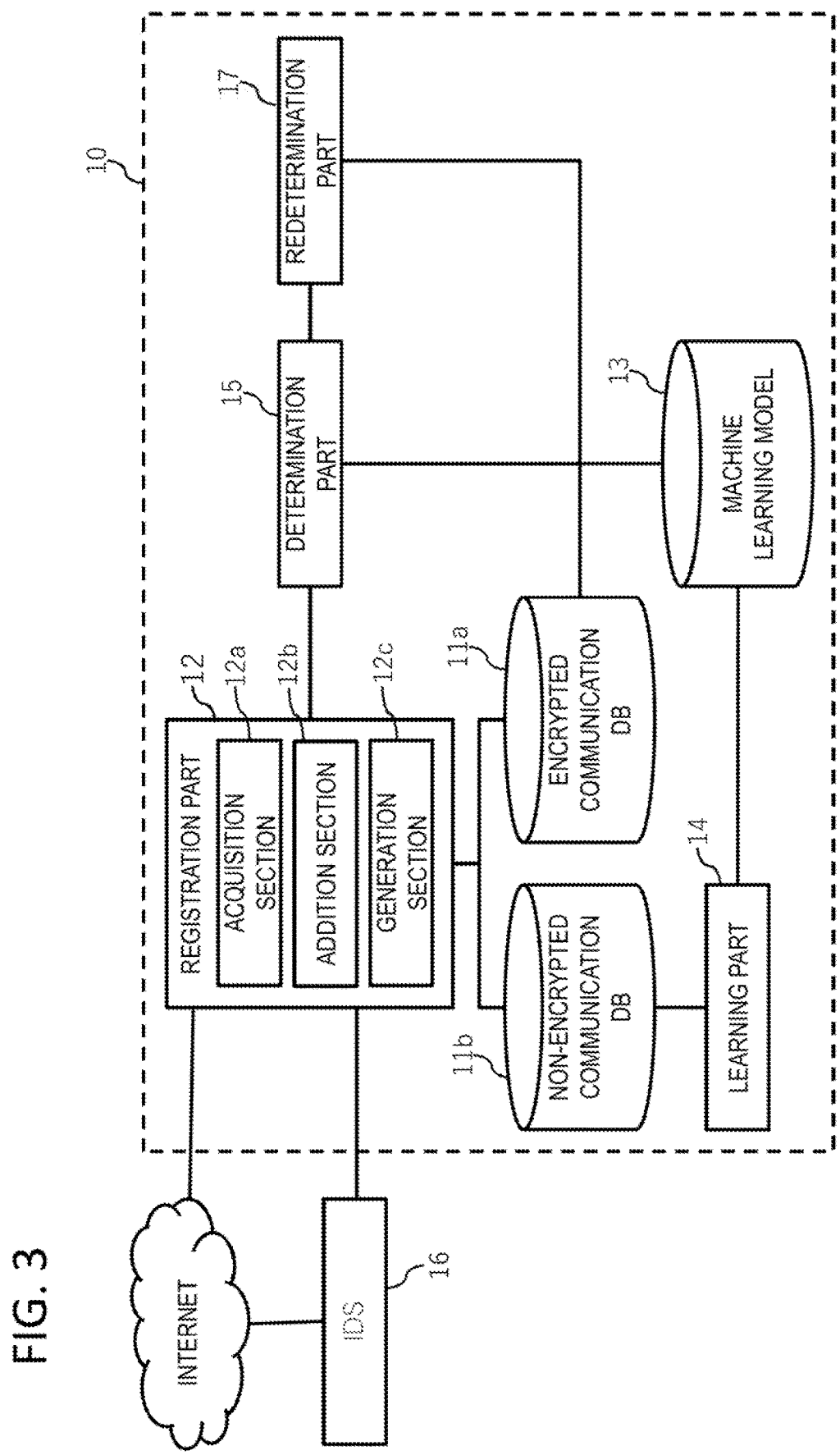
FIG. 3 is a schematic drawing illustrating a suspicious communication detection apparatus according to an example embodiment of the present invention.

FIG. 3 is a schematic diagram illustrating a suspicious communication detection apparatus according to an example embodiment of the present invention. As illustrated in FIG. 3, a suspicious communication detection apparatus 10 according to an example embodiment of the present invention includes databases 11a and 11b, a registration part 12, a machine learning model 13, a learning part 14, a determination part 15, and a redetermination part 17. That is, the suspicious communication detection apparatus 10 illustrated in FIG. 3 includes the redetermination part 17 in addition to the elements of the suspicious communication detection apparatus 10 illustrated in FIG. 1.

As described above, there is a tendency that the determination accuracy is low for inbound encrypted communications. Thus, by using the databases 11a and 11b, the communications from the outside of the organization to the inside of the organization and the communications from the inside of the organization to the outside of the organization are separately managed. The redetermination part 17 compares the destination address(es) of an encrypted communication(s) from the outside of the organization to the inside of the organization, the encrypted communication(s) having been determined as a suspicious communication(s), with the source address(es) of an encrypted communication(s) from the inside of the organization to the outside of the organization, the encrypted communication(s) having been determined as a suspicious communication(s). If the destination address(es) and the source address(es) match, the redetermination part 17 determines the encrypted communication(s) from the outside of the organization to the inside of the organization is a suspicious communication(s). If the destination address(es) and the source address(es) do not match, the redetermination part 17 determines the encrypted communication(s) from the outside of the organization to the inside of the organization is not a suspicious communication(s). In this way, the suspicious communication detection apparatus 10 overcomes the problem in that the determination accuracy is low for inbound encrypted communications.

In the databases 11a and 11b, information extracted from received communications is managed separately as encrypted communications and non-encrypted communications. Although the encrypted communication database 11a for encrypted communications and the non-encrypted communication database 11b for non-encrypted communications are separately illustrated in FIG. 3, as long as these encrypted and non-encrypted communications are managed separately, these communications do not need to be physically separated.

The databases 11a and 11b include communication information management tables that manage session information about communications, communication feature management tables that manage features generated from communications, and communication flag management table(s) that manage flags of encrypted communications determined as suspicious communications. In particular, the encrypted communication database 11a for encrypted communications includes an encrypted communication information management table that holds information about encrypted communications, encrypted communication feature management tables that hold features about encrypted communications, and encrypted communication flag management tables that indicate whether an encrypted communication(s) is a suspicious communication(s). The non-encrypted communication database 11b for non-encrypted communications includes a non-encrypted communication information management table that holds information about non-encrypted communications and a non-encrypted communication feature management table that holds features of non-encrypted communications. FIG. 4 is a diagram illustrating an example of the non-encrypted communication information management table.

As illustrated in FIG. 4, an individual record in the non-encrypted communication information management table indicates session information, which is statistical information from the start of a non-encrypted communication to the end of the non-encrypted communication. A feature identification (ID) is allocated per combination of a source IP address, a destination IP address, and a destination port number. Each record includes a time, a source IP address, a destination IP address, a source port number, a destination port number, a transmission size value (byte number), a reception size value (byte number), a transmission packet number, a reception packet number, a communication time, a direction, a feature ID, and an alert flag.

An alert flag(s) indicates whether a non-encrypted communication(s) relates to an alert(s) in the intrusion detection system (IDS). If a non-encrypted communication matches (=relates to) an alert combination of a source IP address, a destination IP address, and a destination port number, the corresponding alert flag is set to 1. If a non-encrypted communication does not match (=relate to) an alert combination of source IP address, a destination IP address, and a destination port number, the corresponding alert flag is set to 0.

Figure 5:
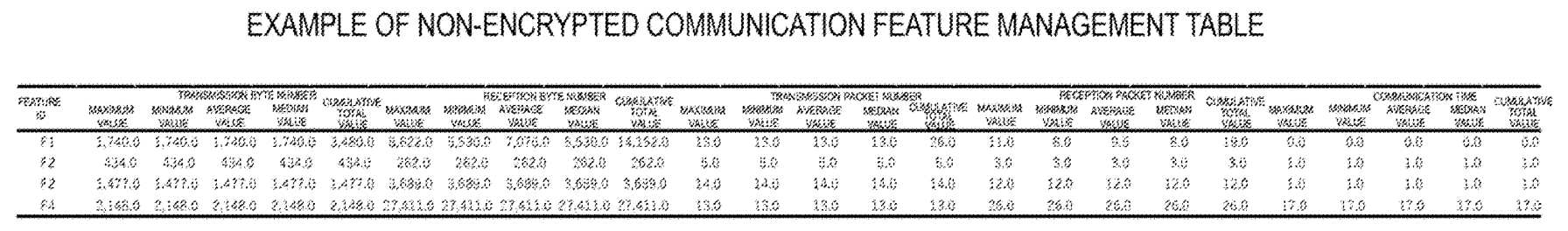

FIG. 5 illustrates an example of a non-encrypted communication feature management table. The non-encrypted communication feature management table manages features generated from communications, and each record is associated with a feature ID and holds features. As illustrated in FIG. 5, for example, the feature management table manages features, which are a maximum value, a minimum value, an average value, a median value, and a cumulative total value of each of the transmission size value (byte number), the reception size value (byte number), the transmission packet number, the reception packet number, and the communication time, per combination of a source IP address, a destination IP address, and a destination port number. In addition, the communications do not need to be managed separately depending on the communication direction. That is, because the inbound communications and the outbound communications do not need to be managed separately, the same non-encrypted communication feature management table is used for managing these two kinds of communications, as illustrated in FIG. 5.

In the non-encrypted communication feature management table, the direction of a communication, that is, whether a communication is an inbound communication or an outbound communication, does not need to be distinguished. However, by referring to the non-encrypted communication information management table illustrated in FIG. 4, it is clear that the communications indicated by feature IDs F1 to F3 are inbound non-encrypted communications and that the communication indicated by a feature ID F4 is an outbound non-encrypted communication.

FIG. 6 is a drawing illustrating an example of the encrypted communication information management table. An individual record in the encrypted communication information management table indicates session information, which is statistical information from the start of an encrypted communication to the end of the encrypted communication. A determination target ID is allocated per combination of a source IP address, a destination IP address, and a destination port number. Each record includes a time, a source IP address, a destination IP address, a source port number, a destination port number, a transmission size value (byte number), a reception size value (byte number), a transmission packet number, a reception packet number, a communication time, a direction, and a determination target ID.

Depending on the session direction of an encrypted communication, a different determination target ID is allocated to the encrypted communication. For example, if the source IP address is the IP address A, the destination IP address is the IP address X, and the destination port number is 443, this communication can be determined as an encrypted communication from the outside of the organization to the inside of the organization. Thus, an inbound determination target ID F_in1 is allocated to this communication.

FIG. 7 is a drawing illustrating examples of encrypted communication feature management tables. These encrypted communication feature management tables manage features generated from encrypted communications, and each record is associated with a determination target ID and holds features. As illustrated in FIG. 7, for example, the individual encrypted communication feature management table manages features, which are a maximum value, a minimum value, an average value, a median value, and a cumulative total value of each of the transmission size value (byte number), the reception size value (byte number), the transmission packet number, the reception packet number, and the communication time, per combination of a source IP address, a destination IP address, and a destination port number. In addition, the inbound communications are managed in one of the encrypted communication feature management tables illustrated in FIG. 7, and the outbound communications are managed in the other encrypted communication feature management table. That is, the communications are managed separately depending on the communication direction.

FIG. 8 illustrates examples of encrypted communication flag management tables. The encrypted communication flag management tables manage flags of encrypted communications determined as suspicious communications. If an encrypted communication is determined as a suspicious communication, the suspicious flag of the encrypted communication is set to 1 in the corresponding one of the encrypted communication flag management tables. If an encrypted communication is not determined as a suspicious communication, the suspicious flag of this encrypted communication is set to 0. The inbound communications are managed in one of the communication flag management tables in FIG. 8, and the outbound communications are managed in the other communication flag management table. That is, the communications are managed separately depending on the communication direction.

The registration part 12 determines whether a received communication(s) is an encrypted communication(s) or a non-encrypted communication(s), performs padding on the transmission and reception size values (byte numbers) and the transmission and reception packet numbers of the non-encrypted communication(s) to fill in a difference from an encrypted communication(s), generates features from the non-encrypted communication(s) obtained after the padding, and registers the features in the databases 11a and 11b. As illustrated in FIG. 3, the registration part 12 includes an acquisition section 12a, an addition section 12b, and a generation section 12c.

The acquisition section 12a determines whether a received communication(s) is an encrypted communication(s) or a non-encrypted communication(s). For example, the acquisition section 12a performs this determination by referring to the destination port number(s) of the received communication(s). If the destination port number of a received communication is 443, the acquisition section 12a determines that the received communication is an encrypted communication. If the destination port number of a received communication is 80, the acquisition section 12a determines that the received communication is a non-encrypted communication. In addition, the acquisition section 12a acquires an alert(s) from the intrusion detection system (IDS) 16 and adds the alert flag(s) to the non-encrypted communication.

The addition section 12b performs padding on the transmission and reception size values (byte numbers) and the transmission and reception packet numbers of a non-encrypted communication(s) to fill in a difference from an encrypted communication(s). HTTPS (443/TCP) corresponding to an encrypted communication(s) uses greater transmission and reception size values (byte numbers) and transmission and reception packet numbers by a TLS handshake than HTTP (80/TCP) corresponding to a non-encrypted communication(s). The addition section 12b fills in the difference between the non-encrypted communication(s) and encrypted communication(s) and uses the received non-encrypted communications as training data for learning performed by the machine learning model 13 that determines whether encrypted communications are suspicious communications. Because the intrusion detection system (IDS) 16 does not function with respect to the encrypted communications, the training data used for learning performed by the machine learning model 13 that determines whether encrypted communications are suspicious communications becomes insufficient. Because the addition section 12b fills in the difference between the non-encrypted communication(s) and encrypted communication(s) and uses the received non-encrypted communications as training data for learning performed by the machine learning model 13 that determines whether encrypted communications are suspicious communications, the problem in that the intrusion detection system (IDS) 16 does not function with respect to the encrypted communications is overcome.

The addition section 12b performs padding on the session information about the individual non-encrypted communication (80/TCP) by using any one of the following patterns, per destination IP address. That is, the addition section 12b adds the following transmission and reception size values (byte numbers) and transmission and reception packet numbers to the measured values of a received non-encrypted communication(s) and uses the obtained results as the session information about the non-encrypted communication(s) (80/TCP).

1. transmission byte number: 900-1,100
   reception byte number: 3,500-4,302
   transmission packet number: 6
   reception packet number: 6
2. transmission byte number: 1,000-1,200
   reception byte number: 4,303-5,000
   transmission packet number: 7
   reception packet number: 7
3. transmission byte number: 900-1,100
   reception byte number: 3,500-4,302
   transmission packet number: 5
   reception packet number: 4
4. transmission byte number: 1,000-1,200
   reception byte number: 4,303-5,000
   transmission packet number: 6
   reception packet number: 5

The size values (byte number) and the packet numbers on which the padding is performed are those that have been calculated from the RFC and behaviors of TLS handshakes, and the above four patterns are established from the difference between TLS1.2 and TLS1.3 and MTU limitations. However, when the original reception packet number is 1 or less, because only a 3-way handshake communication is performed, the padding is not performed for the communication.

The generation section 12c generates features from encrypted communications and non-encrypted communications and registers the features in the databases 11a and 11b. The generation section 12c refers to the communication information management tables based on information about received encrypted communications and non-encrypted communications and acquires feature IDs or determination target IDs. Based on the acquired feature IDs or determination target IDs, the generation section 12c refers to the encrypted communication feature management tables and the non-encrypted communication feature management table and acquires the features of the received encrypted communications and non-encrypted communications. If the features of a received encrypted communication or non-encrypted communication are not stored in any of the encrypted communication feature management tables and the non-encrypted communication feature management table, the generation section 12c newly stores the features calculated from the received encrypted communication or non-encrypted communication in the corresponding one of the encrypted communication feature management tables and the non-encrypted communication feature management table.

The databases 11a and 11b include communication information management tables that manage session information about encrypted communications, communication feature management tables that manage features generated from encrypted communications, and communication flag management tables that manage flags of encrypted communications determined as suspicious communications. The determination part 15 can refer to the databases 11a and 11b by using information about a received encrypted communication(s) and acquire the features of the received encrypted communication(s). In addition, the determination part 15 can determine whether an encrypted communication(s) is a suspicious communication(s) and can record the determination result(s) in the encrypted communication flag management tables. In addition, the databases 11a and 11b provide information so that the redetermination part 17 can perform a redetermination(s) on a determined result(s) obtained by the determination part 15.

The machine learning model 13 receives the features of a communication(s) and determines whether the encrypted communication(s) is a suspicious communication(s). For example, the machine learning model 13 is a determination algorithm for performing this determination. Alternatively, the machine learning model 13 is a determination formula used for this determination. The features entered to the machine learning model 13 are features recorded in the encrypted communication feature management tables in the database 11a. The determination part 15 refers to the encrypted communication feature management tables in the database 11a by using information about a received encrypted communication(s) and acquires the features of the received encrypted communication(s). Next, the determination part 15 enters the acquired features to the machine learning model 13.

The machine learning model 13 may be any machine learning model that can determine whether an encrypted communication(s) is a suspicious communication(s) upon receiving the features of the encrypted communication(s) as input. For example, because the databases 11a and 11b store the detection results obtained by the intrusion detection system (IDS) 16 on the non-encrypted communications, the learning part 14 can adopt, for example, a model that performs binary classification by using the detection results obtained by the intrusion detection system on the non-encrypted communications as a reference. For example, examples of the machine learning model include SVM, RandomForest, and XGBoost.

The determination part 15 refers to the database 11a by using information about a received encrypted communication(s), enters the obtained features to the machine learning model 13, and determines whether the received encrypted communication(s) is a suspicious communication(s). First, the determination part 15 refers to the encrypted communication information management table in the database 11a by using information about a received encrypted communication(s) and acquires a determination target ID of the received encrypted communication(s). Next, the determination part 15 refers to the encrypted communication feature management tables in the database 11a by using the acquired determination target ID and acquires the features of the received encrypted communication(s). Next, the determination part 15 enters the acquired features of the encrypted communication(s) to the machine learning model 13 and determines whether the received encrypted communication(s) is a suspicious communication(s).

After acquiring the result(s) of the determination using the machine learning model 13, the determination part 15 refers to the inbound and outbound encrypted communication flag management tables and changes the suspicious flag(s) associated with the feature ID(s) determined as a suspicious communication(s) to 1. For example, if the encrypted communications having determination target IDs F_in1, F_in2, and F_out1 are determined as suspicious communications, the determination part 15 changes the suspicious flags of the encrypted communications having F_in1, F_in2, and F_out1 to 1, as illustrated in FIG. 9.

The redetermination part 17 performs, based on a determination result(s) of an encrypted communication(s) from the inside of the organization to the outside of the organization, a redetermination(s) on an encrypted communication(s) from the outside of the organization to the inside of the organization. The redetermination part 17 refers to the inbound encrypted communication flag management table in the database 11a and acquires a determination target ID (F_in) associated with 1 as the suspicious flag. Next, the redetermination part 17 refers to the encrypted communication information management table and acquires a destination IP address that matches the above determination target ID (F_in). In addition, the redetermination part 17 refers to the encrypted communication information management table and acquires a feature ID (F_out) that matches the following conditions.

The direction field indicates "outbound"

The source IP address of F_out=the destination IP address of F_in

Next, the redetermination part 17 refers to the outbound flag management table and acquires the suspicious flag associated with the above determination target ID (F_out). Next, depending on the suspicious flag, the redetermination part 17 updates the value of the suspicious flag associated with the above determination target ID (F_out). If there is an F_out associated with 1 as the suspicious flag, the redetermination part 17 changes the suspicious flag associated with F_in to 1. If there is no F_out associated with 1 as the suspicious flag, the redetermination part 17 changes the suspicious flag associated with F_in to 0. For example, as illustrated in FIG. 8, if the suspicious flags of the encrypted communications associated with F_in1, F_in2, and F_out1 indicate 1, F_in1 and F_out1 match the above conditions. Thus, the redetermination part 17 maintains the suspicious flag 1 associated with F_in1 and changes the suspicious flag associated with F_in2 to 0, as illustrated in FIG. 10. That is, as a result of the redetermination, the encrypted communication associated with F_in2 and determined as a suspicious communication has been reviewed, and the suspicious flag has been changed to 0.

[Suspicious Communication Detection Method]

Next, a suspicious communication detection method according to the example embodiment of the present invention will be described. In the suspicious communication detection method according to the example embodiment of the present invention, an information processing apparatus, which includes a database in which information extracted from received communications is managed separately as encrypted communications and non-encrypted communications and a machine learning model that receives features of a communication(s) and determines whether the communication(s) is a suspicious communication(s), determines whether a received communication(s) is an encrypted communication(s) or a non-encrypted communication(s), performs padding on the transmission and reception size values (byte numbers) and the transmission and reception packet numbers of the non-encrypted communication(s) to fill in a difference from an encrypted communication(s), generates features from the non-encrypted communication(s) obtained after the padding, registers the features in the database, trains the machine learning model by using the features of the non-encrypted communications registered in the database as training data, refers to the database by using information about a received encrypted communication(s), enters the features obtained about the received encrypted communication(s) to the machine learning model, and determines whether the received encrypted communication(s) is a suspicious communication(s). The execution of the suspicious communication detection method is not limited to any apparatus configuration. However, for ease of description, the suspicious communication detection method will be described by using the configuration of the suspicious communication detection apparatus 10 illustrated in FIG. 1.

Figure 11:
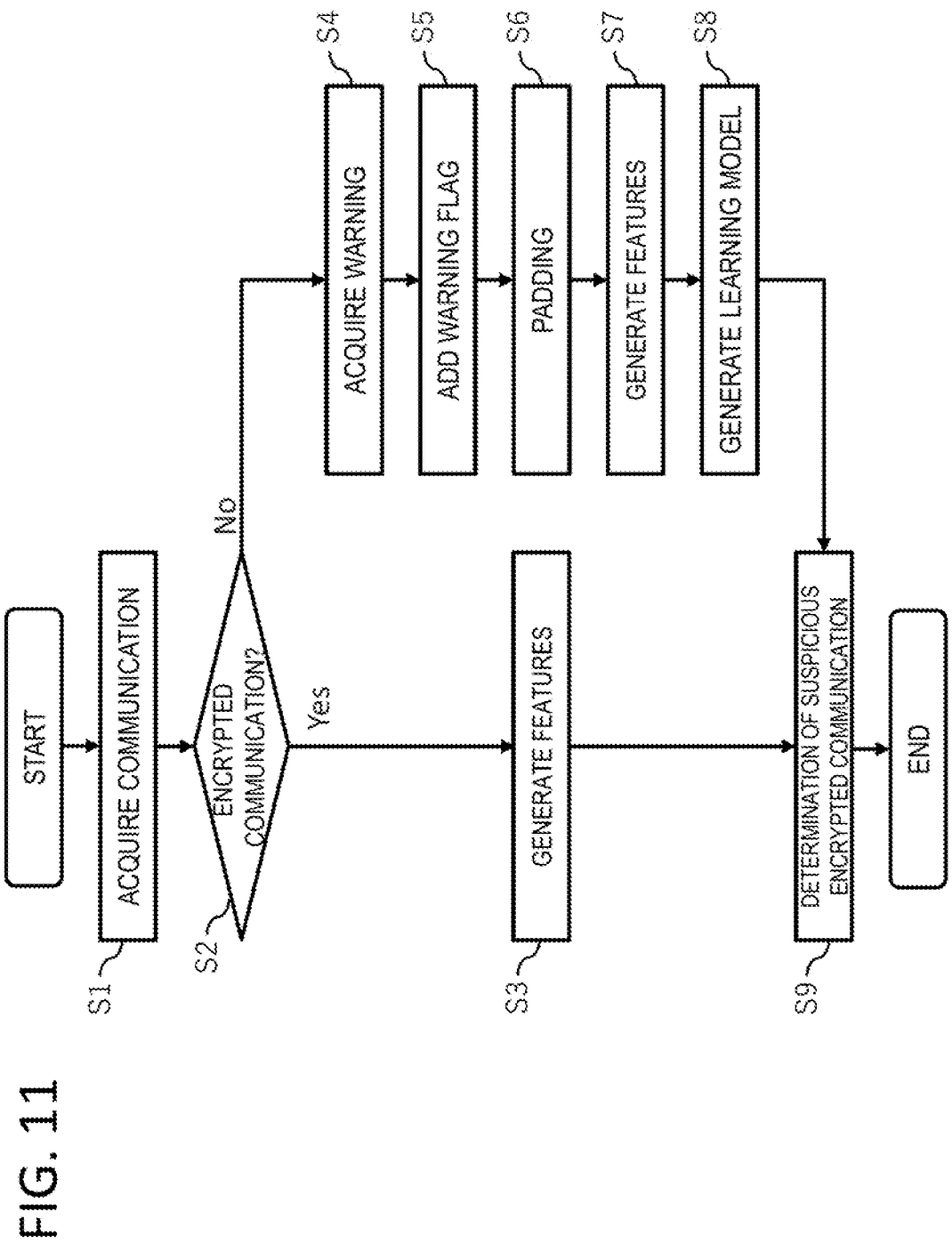
FIG. 11 is a flowchart illustrating a procedure of a suspicious communication detection method according to the example embodiment of the present invention.

FIG. 11 is a flowchart illustrating a procedure of the suspicious communication detection method of the example embodiment of the present invention. As illustrated in FIG. 11, the procedure of the suspicious communication detection method includes acquisition of a communication (step S1), determination of an encrypted communication (step S2), generation of features (step S3), acquisition of a warning (step S4), addition of a warning flag (step S5), padding (step S6), generation of features (step S7), generation of a learning model (step S8), and determination of a suspicious encrypted communication (step S9).

The registration part 12 receives a communication(s) from the outside of the organization to the inside of the organization or a communication(s) from the inside of the organization to the outside of the organization and acquires information about the communication (step S1). Next, the registration part 12 determines whether the received communication(s) is an encrypted communication(s) or a non-encrypted communication(s) (step S2). The registration part 12 performs this determination by referring to the destination port number(s), for example. If the destination port number(s) of a received communication(s) is 443, the registration part 12 determines that the received communication(s) is an encrypted communication(s). If the destination port number(s) of a received communication(s) is 80, the registration part 12 determines that the received communication(s) is a non-encrypted communication(s).

If the registration part 12 determines that the received communication(s) is an encrypted communication(s) (step S2; Yes), the registration part 12 refers to the database 11a and acquires the features about the received encrypted communication(s) (step S3). If the features are not stored in the encrypted communication feature management table(s), the registration part 12 newly stores the features calculated from the received encrypted communication(s) in the feature management table(s).

If the registration part 12 determines that the received communication(s) is a non-encrypted communication(s) (step S2; No), the registration part 12 acquires an alert(s) from the intrusion detection system (IDS) 16 (step S4) and adds an alert flag(s) to the non-encrypted communication(s) (step S5). Next, the registration part 12 performs padding on the transmission and reception size values (byte numbers) and the transmission and reception packet numbers of the non-encrypted communication(s) to fill in a difference from an encrypted communication(s) (step S6). HTTPS (443/TCP) corresponding to an encrypted communication(s) uses greater transmission and reception size values (byte numbers) and transmission and reception packet numbers by a TLS handshake than HTTP (80/TCP) corresponding to a non-encrypted communication(s). Thus, the registration part 12 fills in the difference between the non-encrypted communication(s) and encrypted communication(s) and uses the received non-encrypted communications as training data for learning performed by the machine learning model 13 that determines whether encrypted communications are suspicious communications. Next, the registration part 12 refers to the database 11*b* and generates features from the non-encrypted communication(s) obtained after the padding (step S7).

Next, the learning part 14 trains the machine learning model 13 by using the features generated from the non-encrypted communication(s) obtained after the padding (step S8). At this point, because alerts have already been acquired from the intrusion detection system (IDS) 16 regarding the non-encrypted communications, the machine learning model 13 can be trained by using the detection results obtained by the intrusion detection system on the non-encrypted communications as a reference. That is, although the intrusion detection system (IDS) 16 does not function with respect to the encrypted communications, because the registration part 12 performs padding on the transmission and reception size values (byte numbers) and the transmission and reception packet numbers of the non-encrypted communication(s) to fill in a difference from an encrypted communication(s), the machine learning model 13 can be trained in which the detection results obtained by the intrusion detection system (IDS) 16 are reflected on the non-encrypted communications.

The determination part 15 enters the features about the encrypted communication(s) acquired in step S3 to the machine learning model 13 and determines whether the received encrypted communication(s) is a suspicious communication(s) (step S9). The determination result(s) obtained by the determination part 15 is stored in the flag management tables in the database 11*a*. Specifically, if the determination part 15 determines that the received encrypted communication(s) is a suspicious communication(s), the determination part 15 changes the flag(s) in the flag management table(s) to 1.

As described above, in the suspicious communication detection method according to the example embodiment of the present invention, although the intrusion detection system (IDS) 16 does not function with respect to the encrypted communications, because the registration part 12 performs padding on the transmission and reception size values (byte number) and the transmission and reception packet numbers of the non-encrypted communication(s) to fill in a difference from an encrypted communication(s), the machine learning model 13 can be trained in which the detection results obtained by the intrusion detection system (IDS) 16 are reflected on the encrypted communications while reflecting the detection results obtained by the intrusion detection system (IDS) 16 on the non-encrypted communications. As a result, it is possible to determine whether an encrypted communication(s) is a suspicious communication(s) while reflecting the detection results obtained by the intrusion detection system (IDS) 16.

[Example of Hardware Configuration]

Figure 12:
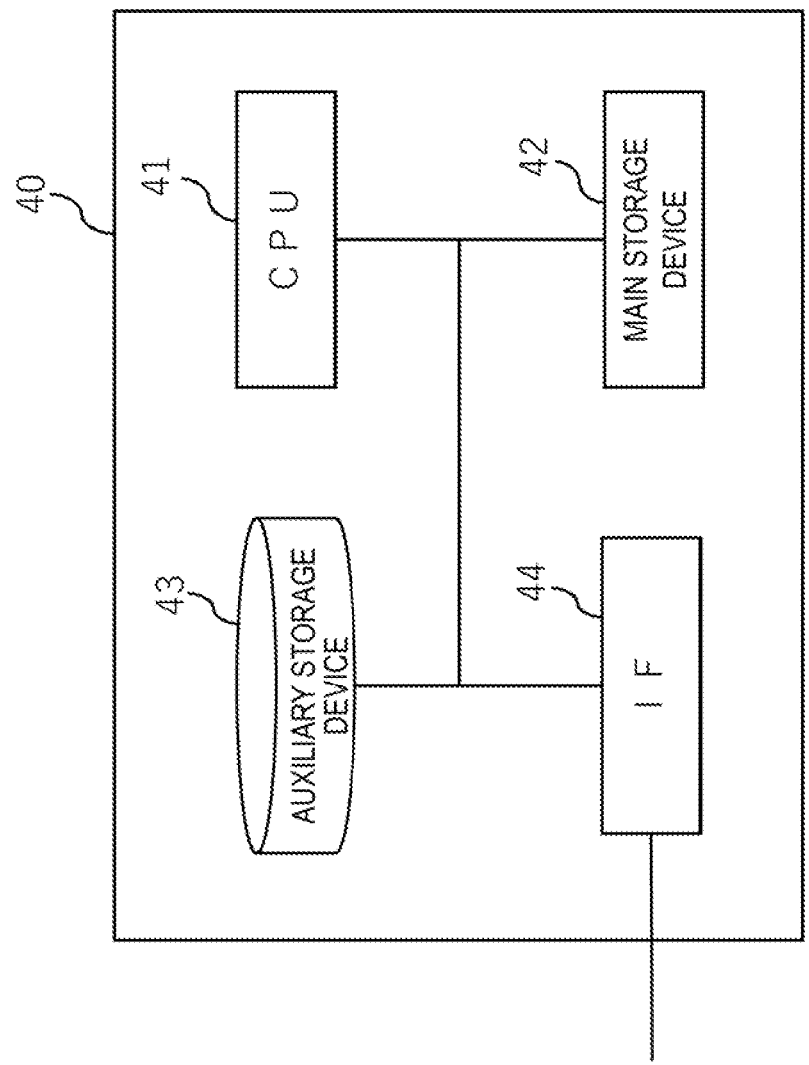
FIG. 12 is a diagram illustrating an example of a hardware configuration of the suspicious communication detection apparatus.

FIG. 12 is a drawing illustrating an example of a hardware configuration of the suspicious communication detection apparatus. An information processing apparatus (a computer) that adopts the hardware configuration illustrated in FIG. 12 is able to realize the above-described functions of the suspicious communication detection apparatus 10. The hardware configuration example illustrated in FIG. 12 is an example of the hardware configuration that realizes the functions of the suspicious communication detection apparatus 10 and does not limit the hardware configuration of the suspicious communication detection apparatus 10. The suspicious communication detection apparatus 10 may include hardware not illustrated in FIG. 12.

As illustrated in FIG. 12, a hardware configuration 40 that can be adopted by the suspicious communication detection apparatus 10 includes a CPU (Central Processing Unit) 41, a main storage device 42, an auxiliary storage device 43, and an IF (Interface) part 44, which are connected to each other via an internal bus, for example.

The CPU 41 executes individual instructions included in a program executed by the suspicious communication detection apparatus 10. The main storage device 42 is, for example, a RAM (Random Access Memory) and temporarily stores various kinds of programs so that the CPU 41 in the suspicious communication detection apparatus 10 can execute the programs.

The auxiliary storage device 43 is, for example, an HDD (Hard Disk Drive) and can store, for example, various kinds of programs executed by the suspicious communication detection apparatus 10 in the mid to long term. Various kinds of programs can be provided as a program product recorded in a non-transitory computer-readable storage medium. The auxiliary storage device 43 can be used to store various kinds of programs recorded in the non-transitory computer-readable storage medium in the mid to long term. The IF part 44 provides an interface relating to the communications performed by the suspicious communication detection apparatus 10.

An information processing apparatus that adopts the above-described hardware configuration 40 can realize the functions of the suspicious communication detection apparatus 10.

The above example embodiments can partially or entirely be described, but not limited to, as the following notes.

[Note 1]

A suspicious communication detection apparatus, including:
  a database in which information extracted from received communications is managed separately as encrypted communications and as non-encrypted communications;
  a registration part that determines whether a received communication is an encrypted communication or a non-encrypted communication, performs padding on transmission and reception size values and transmission and reception packet numbers of the non-encrypted communication to fill in a difference from an encrypted communication, generates features from the non-encrypted communication obtained after the padding, and registers the features in the database;
a learning part that trains a machine learning model by using features of non-encrypted communications registered in the database as training data, wherein the machine learning model receives features of an encrypted communication, and determines whether the encrypted communication is a suspicious communication; and
a determination part that refers to the database by using information about a received encrypted communication, enters obtained features about the received encrypted communication to the machine learning model, and determines whether the received encrypted communication is a suspicious communication.

[Note 2]

The suspicious communication detection apparatus according to note 1;
wherein the database stores detection results obtained by an intrusion detection system on the non-encrypted communications; and
wherein the learning part trains the machine learning model by using the detection results obtained by the intrusion detection system on the non-encrypted communications as a reference.

[Note 3]

The suspicious communication detection apparatus according to note 1;
wherein in the database, communications from an outside of an organization to an inside of the organization are managed separately from communications from the inside of the organization to the outside of the organization; and
wherein the suspicious communication detection apparatus further includes a redetermination part that compares a destination address of an encrypted communication from the outside of the organization to the inside of the organization, the encrypted communication having been determined as a suspicious communication, with a source address of an encrypted communication from the inside of the organization to the outside of the organization, the encrypted communication having been determined as a suspicious communication, determines that the encrypted communication from the outside of the organization to the inside of the organization is a suspicious communication if the destination address and the source address match, and determines that the encrypted communication from the outside of the organization to the inside of the organization is not a suspicious communication if the destination address and the source address do not match.

[Note 4]

The suspicious communication detection apparatus according to note 1; wherein the database includes a communication information management table that manages session information about communications, a feature management table that manages features generated from communications, and a flag management table that manages flags of encrypted communications determined as suspicious communications.

[Note 5]

The suspicious communication detection apparatus according to note 4; wherein the feature management table manages features, which are a maximum value, a minimum value, an average value, a median value, and a cumulative total value of each of a transmission size value, a reception size value, a transmission packet number, a reception packet number, and a communication time, per combination of a source IP address, a destination IP address, and a destination port number.

[Note 6]

The suspicious communication detection apparatus according to note 4; wherein, in the feature management table, encrypted communications from an outside of an organization to an inside of the organization are managed separately from encrypted communications from the inside of the organization to the outside of the organization.

[Note 7]

A suspicious communication detection method, including:
causing an information processing apparatus, which includes a database in which information extracted from received communications is managed separately as encrypted communications and as non-encrypted communications and a machine learning model that receives features of a communication and determines whether the communication is a suspicious communication, to determine whether a received communication is an encrypted communication or a non-encrypted communication;
causing the information processing apparatus to perform padding on transmission and reception size values and transmission and reception packet numbers of the non-encrypted communication to fill in a difference from an encrypted communication;
causing the information processing apparatus to generate features from the non-encrypted communication obtained after the padding and register the features in the database;
causing the information processing apparatus to train the machine learning model by using features of non-encrypted communications registered in the database as training data; and
causing the information processing apparatus to refer to the database by using information about a received encrypted communication, enter obtained features about the received encrypted communication to the machine learning model, and determine whether the received encrypted communication is a suspicious communication.

[Note 8]

The suspicious communication detection method according to note 7;
wherein the database stores detection results obtained by an intrusion detection system on the non-encrypted communications; and
wherein the information processing apparatus trains the machine learning model by using the detection results obtained by the intrusion detection system on the non-encrypted communications as a reference.

[Note 9]

A non-transient computer readable medium storing a program, causing an information processing apparatus, which includes a database in which information extracted from received communications is managed separately as encrypted communications and as non-encrypted communications and a machine learning model that receives features of a communication and determines whether the communication is a suspicious communication, to perform:
determining whether a received communication is an encrypted communication or a non-encrypted communication;
performing padding on transmission and reception size values and transmission and reception packet numbers of the non-encrypted communication to fill in a difference from an encrypted communication;

generating features from the non-encrypted communication obtained after the padding and registering the features in the database;

training the machine learning model by using features of non-encrypted communications registered in the database as training data; and referring to the database by using information about a received encrypted communication, entering obtained features about the received encrypted communication to the machine learning model, and determining whether the received encrypted communication is a suspicious communication.

[Note 10]

The non-transient computer readable medium storing the program according to note 9;

wherein the database stores detection results obtained by an intrusion detection system on the non-encrypted communications; and wherein the information processing apparatus trains the machine learning model by using the detection results obtained by the intrusion detection system on the non-encrypted communications as a reference.

If the present invention indicates an algorithm, software, a flowchart, or an automated process step, it is obvious that a computer is used. It is also obvious that the computer is provided with a processor and a memory or a storage device. Thus, even if these elements are not explicitly described, the present application should of course be deemed to include description of these elements.

The disclosure of the above PTL, etc., which have been referred to, is incorporated herein by reference thereto. Modifications and adjustments of the example embodiment and examples are possible within the scope of the overall disclosure (including the claims) of the present invention and based on the basic technical idea of the present invention. Various combinations and selections (including partial deletion) of various disclosed elements (including the elements in each of the claims, example embodiments, examples, drawings, etc.) are possible within the scope of the overall disclosure of the present invention. That is, the present invention of course includes various variations and modifications that could be made by those skilled in the art according to the overall disclosure including the claims and the technical idea. The specification discloses numerical value ranges. However, even if the specification does not particularly disclose numerical values or small ranges included in the ranges, these values and ranges should be deemed to have been specifically disclosed. In addition, as needed and based on the gist of the present invention, partial or entire use of the individual disclosed matters in the above literature, which has been referred to, as part of the disclosure of the present invention in combination with what is disclosed in the present application should be deemed to be included in what is disclosed in the present application.

REFERENCE SIGNS LIST

10 suspicious communication detection apparatus
11a, 11b database
12 registration part
12a acquisition section
12b addition section
12c generation section
13 machine learning model
14 learning part
15 determination part
16 intrusion detection system
17 redetermination part
10a to 10c, 10A to 10D information processing apparatus
40 hardware configuration
41 CPU
42 main storage device
43 auxiliary storage device
44 IF part

What is claimed is:

1. A suspicious communication detection apparatus comprising:

a processor; and a memory storing:

a database in which information extracted from received communications is managed separately as encrypted communications and as non-encrypted communications, wherein in the database, the communications received from outside of an organization to inside of the organization are managed separately from the communications received from the inside of the organization to the outside of the organization, and the database stores detection results obtained by an intrusion detection system on the non-encrypted communications; and program instructions that are executable by the processor to implement:

a registration part that:

determines whether a received communication is an encrypted communication or a non-encrypted communication;

in response to determining that the received communication is encrypted communication, generates features from the encrypted communication and stores the features generated from the encrypted communication in the database;

in response to determining that the received communication is non-encrypted communication:

acquires an alert from the intrusion detection system;

adds an alert flag to the non-encrypted communication:

performs padding on transmission and reception size values and transmission and reception packet numbers of the non-encrypted communication to fill in a difference from an encrypted communication;

generates features from the non-encrypted communication obtained after the padding; and registers the features generated from the non-encrypted communication in the database;

a learning part that trains a machine learning model by using the features of the non-encrypted communications registered in the database as training data and the detection results obtained by the intrusion detection system on the non-encrypted communications as a reference, wherein the machine learning model:

receives the features of the encrypted communication; and determines whether the encrypted communication is a suspicious communication; and a determination part that:

refers to the database by using information about the received encrypted communication and obtains the features about the received encrypted communication from the database;

enters the obtained features about the received encrypted communication to the machine learning model trained by the learning part; and determines whether the received encrypted communication is the suspicious communication.

2. The suspicious communication detection apparatus according to claim 1, wherein the suspicious communication detection apparatus further comprises a redetermination part, implemented by the program instructions that are executable by the processor, and wherein the redetermination part:

compares a destination address of an encrypted communication from the outside of the organization to the inside of the organization, the encrypted communication having been determined as a suspicious communication, with a source address of an encrypted communication from the inside of the organization to the outside of the organization, the encrypted communication having been determined as a suspicious communication;

determines that the encrypted communication from the outside of the organization to the inside of the organization is a suspicious communication in a case where the destination address and the source address match; and determines that the encrypted communication from the outside of the organization to the inside of the organization is not a suspicious communication in a case where the destination address and the source address do not match.

3. The suspicious communication detection apparatus according to claim 1, wherein the database includes:

a communication information management table that manages session information about communications;

a feature management table that manages features generated from communications; and a flag management table that manages flags of encrypted communications determined as suspicious communications.

4. The suspicious communication detection apparatus according to claim 3, wherein the feature management table manages features, which are a maximum value, a minimum value, an average value, a median value, and a cumulative total value of each of a transmission size value, a reception size value, a transmission packet number, a reception packet number, and a communication time, per combination of a source IP address, a destination IP address, and a destination port number.

5. The suspicious communication detection apparatus according to claim 3, wherein, in the feature management table, encrypted communications from the outside of an organization to the inside of the organization are managed separately from encrypted communications from the inside of the organization to the outside of the organization.

6. A suspicious communication detection method performed by an information processing apparatus, wherein the information processing apparatus is implemented by at least one processor and includes:

a database in which information extracted from received communications is managed separately as encrypted communications and as non-encrypted communications; and a machine learning model that receives features of a communication and determines whether the communication is a suspicious communication, wherein in the database, the communications received from outside of an organization to inside of the organization are managed separately from the communications received from the inside of the organization to the outside of the organization, and the database stores detection results obtained by an intrusion detection system on the non-encrypted communications, and wherein the suspicious communication detection method comprises:

determining whether a received communication is an encrypted communication or a non-encrypted communication;

in response to determining that the received communication is encrypted communication, generating features from the encrypted communication and store the features generated from the encrypted communication in the database;

in response to determining that the received communication is non-encrypted communication:

acquiring an alert from the intrusion detection system;

adding an alert flag to the non-encrypted communication;

performing padding on transmission and reception size values and transmission and reception packet numbers of the non-encrypted communication to fill in a difference from the encrypted communication;

generating, features from the non-encrypted communication obtained after the padding and register the features generated from the non-encrypted communication in the database;

training the machine learning model by using the features of the non-encrypted communication registered in the database as training data and the detection results obtained by the intrusion detection system on the non-encrypted communications as a reference; and referring to the database by using information about the received encrypted communication and obtaining the features about the received encrypted communication stored in the database;

entering the obtained features about the received encrypted communication to the machine learning model trained by the information processing apparatus; and determining whether the received encrypted communication is the suspicious communication.

7. The suspicious communication detection method according to claim 6, further comprising:

comparing a destination address of an encrypted communication from the outside of the organization to the inside of the organization, the encrypted communication having been determined as a suspicious communication, with a source address of an encrypted communication from the inside of the organization to the outside of the organization, the encrypted communication having been determined as a suspicious communication;

determining that the encrypted communication from the outside of the organization to the inside of the organization is a suspicious communication in a case where the destination address and the source address match; and determines that the encrypted communication from the outside of the organization to the inside of the organization is not a suspicious communication in a case where the destination address and the source address do not match.

8. The suspicious communication detection method according to claim 6, wherein the database includes:
a communication information management table that manages session information about communications;
a feature management table that manages features generated from communications; and
a flag management table that manages flags of encrypted communications determined as suspicious communications.

9. The suspicious communication detection method according to claim 8, wherein the feature management table manages features, which are a maximum value, a minimum value, an average value, a median value, and a cumulative total value of each of a transmission size value, a reception size value, a transmission packet number, a reception packet number, and a communication time, per combination of a source IP address, a destination IP address, and a destination port number.

10. The suspicious communication detection method according to claim 8, wherein, in the feature management table, encrypted communications from the outside of an organization to the inside of the organization are managed separately from encrypted communications from the inside of the organization to the outside of the organization.

11. A non-transitory computer readable medium storing a program executable by an information processing apparatus to perform processing,
wherein the information processing apparatus is implemented by at least one processor and includes:
a database in which information extracted from received communications is managed separately as encrypted communications and as non-encrypted communications; and
a machine learning model that receives features of a communication and determines whether the communication is a suspicious communication, wherein
in the database, the communications received from outside of an organization to inside of the organization are managed separately from the communications received from the inside of the organization to the outside of the organization, and
the database stores detection results obtained by an intrusion detection system on the non-encrypted communications,
and wherein the processing comprises:
determining whether a received communication is an encrypted communication or a non-encrypted communication;
in response to determining that the received communication is encrypted communication, generating features from the encrypted communication and store the features generated from the encrypted communication in the database;
in response to determining that the received communication is non-encrypted communication:
acquiring an alert from the intrusion detection system;
adding an alert flag to the non-encrypted communication;
performing padding on transmission and reception size values and transmission and reception packet numbers of the non-encrypted communication to fill in a difference from the encrypted communication;
generating, features from the non-encrypted communication obtained after the padding and register the features generated from the non-encrypted communication in the database;
training the machine learning model by using the features of the non-encrypted communication registered in the database as training data and the detection results obtained by the intrusion detection system on the non-encrypted communications as a reference; and
referring to the database by using information about the received encrypted communication and obtaining the features about the received encrypted communication stored in the database;
entering the obtained features about the received encrypted communication to the machine learning model trained by the information processing apparatus; and
determining whether the received encrypted communication is the suspicious communication.

12. The non-transitory computer readable medium according to claim 11, wherein the processing further comprises:
comparing a destination address of an encrypted communication from the outside of the organization to the inside of the organization, the encrypted communication having been determined as a suspicious communication, with a source address of an encrypted communication from the inside of the organization to the outside of the organization, the encrypted communication having been determined as a suspicious communication;
determining that the encrypted communication from the outside of the organization to the inside of the organization is a suspicious communication in a case where the destination address and the source address match; and
determines that the encrypted communication from the outside of the organization to the inside of the organization is not a suspicious communication in a case where the destination address and the source address do not match.

13. The non-transitory computer readable medium according to claim 11, wherein the database includes:
a communication information management table that manages session information about communications;
a feature management table that manages features generated from communications; and
a flag management table that manages flags of encrypted communications determined as suspicious communications.

14. The non-transitory computer readable medium according to claim 13, wherein the feature management table manages features, which are a maximum value, a minimum value, an average value, a median value, and a cumulative total value of each of a transmission size value, a reception size value, a transmission packet number, a reception packet number, and a communication time, per combination of a source IP address, a destination IP address, and a destination port number.

15. The non-transitory computer readable medium according to claim 13, wherein, in the feature management table, encrypted communications from the outside of an organization to the inside of the organization are managed separately from encrypted communications from the inside of the organization to the outside of the organization.

* * * * *